(12) United States Patent
Padovani et al.

(10) Patent No.: US 9,124,344 B2
(45) Date of Patent: Sep. 1, 2015

(54) PILOT REFERENCE TRANSMISSION FOR A WIRELESS COMMUNICATION SYSTEM

(75) Inventors: Roberto Padovani, San Diego, CA (US); Peter John Black, San Diego, CA (US); Nagabhushana T. Sindhushayana, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 409 days.

(21) Appl. No.: 12/874,156

(22) Filed: Sep. 1, 2010

(65) Prior Publication Data

US 2010/0323748 A1    Dec. 23, 2010

Related U.S. Application Data

(60) Division of application No. 11/858,840, filed on Sep. 20, 2007, which is a continuation of application No. 09/702,142, filed on Oct. 30, 2000, now Pat. No. 7,289,473, which is a continuation-in-part of (Continued)

(51) Int. Cl.
*H04J 3/06* (2006.01)
*H04J 3/00* (2006.01)
(Continued)

(52) U.S. Cl.
CPC ............... *H04B 7/2687* (2013.01); *H04B 1/707* (2013.01); *H04W 52/325* (2013.01); *H04B 2201/70701* (2013.01); *H04J 3/0644* (2013.01)

(58) Field of Classification Search
CPC ..... H04J 3/0685; H04J 3/0664; H04J 3/0608; H04J 3/0605; H04J 3/0632; H04J 3/0682; H04J 3/0614; H04J 3/00; H04L 47/10
USPC .................. 370/503, 509, 510, 516, 519, 520
See application file for complete search history.

(56) References Cited

U.S. PATENT DOCUMENTS 3,018,663 A    1/1962  Dunlop
3,534,264 A    10/1970 Blasbalg et al.
(Continued)

FOREIGN PATENT DOCUMENTS

BR    9607900 A    1/1998
BR    9607621 A    6/1998
(Continued)

OTHER PUBLICATIONS

Hayes Microcomputer Products, Inc., Smartmodem 1200B Hardware Reference Manual, Norcross, GA, 1986.
(Continued)

*Primary Examiner* — Ronald B Abelson
(74) *Attorney, Agent, or Firm* — Dalei Dong

(57) ABSTRACT

A pilot reference transmission scheme well suited for high data rate wireless communication systems is disclosed. To maximize the amount of interference from transmissions from neighboring transmission sources (e.g., access points or base stations) during the pilot interval, and hence minimize the amount of interference from non-transmitting sources during the data intervals, the pilot references are transmitted in bursts at predetermined time intervals, and the pilot bursts from the access points are synchronized. This results in maximum interference contributions from non-transmitting neighboring access points, facilitating reliable estimation of worst case carrier-to-interference (C/I), and further allows the receiving devices (e.g., access terminals) to easily recognize the bursts as pilot reference. In one embodiment, each access point transmits the pilot bursts at or near its maximum transmit power level and no user-specific data is transmitted during the pilot bursts.

22 Claims, 7 Drawing Sheets

Related U.S. Application Data application No. 09/575,073, filed on May 19, 2000, now Pat. No. 6,894,994, and a continuation-in-part of application No. 08/963,386, filed on Nov. 3, 1997, now Pat. No. 6,574,211.

(60) Provisional application No. 60/163,350, filed on Nov. 3, 1999.

(51) Int. Cl.
 H04L 12/801 (2013.01)
 H04B 7/26 (2006.01)
 H04B 1/707 (2011.01)
 H04W 52/32 (2009.01)

(56) References Cited

U.S. PATENT DOCUMENTS

| | | |
|---|---|---|
| 4,047,151 A | 9/1977 | Rydbeck et al. |
| 4,131,765 A | 12/1978 | Kahn |
| 4,256,925 A | 3/1981 | Goode |
| 4,261,054 A | 4/1981 | Scharla-Nielsen |
| 4,309,764 A | 1/1982 | Acampora |
| 4,383,315 A | 5/1983 | Torng |
| 4,491,947 A | 1/1985 | Frank |
| 4,495,619 A | 1/1985 | Acampora |
| 4,495,648 A | 1/1985 | Giger |
| 4,547,880 A | 10/1985 | De Vita et al. |
| 4,675,863 A | 6/1987 | Paneth et al. |
| 4,720,829 A | 1/1988 | Fukasawa et al. |
| 4,756,007 A | 7/1988 | Qureshi et al. |
| 4,785,450 A | 11/1988 | Bolgiano et al. |
| 4,789,983 A | 12/1988 | Acampora et al. |
| 4,817,089 A | 3/1989 | Paneth et al. |
| 4,901,307 A | 2/1990 | Gilhousen et al. |
| 4,901,319 A | 2/1990 | Ross |
| 4,910,794 A | 3/1990 | Mahany |
| 4,914,651 A | 4/1990 | Lusignan |
| 4,931,250 A | 6/1990 | Greszczuk |
| 4,939,731 A | 7/1990 | Reed et al. |
| 4,991,184 A | 2/1991 | Hashimoto |
| 5,003,534 A | 3/1991 | Gerhardt et al. |
| 5,022,046 A | 6/1991 | Morrow, Jr. |
| 5,038,399 A | 8/1991 | Bruckert |
| 5,056,109 A | 10/1991 | Gilhousen et al. |
| 5,093,924 A | 3/1992 | Toshiyuki et al. |
| 5,101,501 A | 3/1992 | Gilhousen et al. |
| 5,103,459 A | 4/1992 | Gilhousen et al. |
| 5,115,429 A | 5/1992 | Hluchyj et al. |
| 5,191,583 A | 3/1993 | Pearson et al. |
| 5,204,876 A | 4/1993 | Bruckert et al. |
| 5,235,614 A | 8/1993 | Bruckert et al. |
| 5,267,261 A | 11/1993 | Blakeney, II et al. |
| 5,267,262 A | 11/1993 | Wheatley, III |
| 5,276,261 A | 1/1994 | Mayer et al. |
| 5,280,472 A | 1/1994 | Gilhousen et al. |
| 5,280,537 A | 1/1994 | Sugiyama et al. |
| 5,289,527 A | 2/1994 | Tiedemann, Jr. |
| 5,297,192 A | 3/1994 | Gersberg |
| 5,305,308 A | 4/1994 | English et al. |
| 5,307,351 A | 4/1994 | Webster |
| 5,317,123 A | 5/1994 | Ito |
| 5,343,513 A | 8/1994 | Kay et al. |
| 5,373,502 A | 12/1994 | Turban |
| 5,375,123 A | 12/1994 | Andersson et al. |
| 5,383,219 A | 1/1995 | Wheatley, III et al. |
| 5,386,589 A | 1/1995 | Kanai |
| 5,396,516 A | 3/1995 | Padovani et al. |
| 5,400,328 A | 3/1995 | Burren et al. |
| 5,404,376 A | 4/1995 | Dent |
| 5,412,687 A | 5/1995 | Sutton et al. |
| 5,414,796 A | 5/1995 | Jacobs et al. |
| 5,416,797 A | 5/1995 | Gilhousen et al. |
| 5,425,051 A | 6/1995 | Mahany |
| 5,434,860 A | 7/1995 | Riddle |
| 5,442,625 A | 8/1995 | Gitlin et al. |
| 5,459,727 A | 10/1995 | Vannucci |
| 5,461,639 A | 10/1995 | Wheatley, III |
| 5,465,388 A | 11/1995 | Zicker |
| 5,469,471 A | 11/1995 | Wheatley, III |
| 5,485,486 A | 1/1996 | Gilhousen et al. |
| 5,491,837 A | 2/1996 | Haartsen |
| 5,497,395 A | 3/1996 | Jou |
| 5,504,773 A | 4/1996 | Padovani et al. |
| 5,528,593 A | 6/1996 | English et al. |
| 5,530,693 A | 6/1996 | Averbuch et al. |
| 5,530,700 A | 6/1996 | Tran et al. |
| 5,533,004 A | 7/1996 | Jasper et al. |
| 5,535,239 A | 7/1996 | Padovani et al. |
| 5,537,410 A | 7/1996 | Li |
| 5,559,789 A * | 9/1996 | Nakano et al. ............... 370/342 |
| 5,564,080 A | 10/1996 | Eul et al. |
| 5,566,175 A | 10/1996 | Davis |
| 5,568,483 A | 10/1996 | Padovani et al. |
| 5,577,022 A * | 11/1996 | Padovani et al. ............ 370/332 |
| 5,577,087 A | 11/1996 | Furuya |
| 5,579,306 A | 11/1996 | Dent |
| 5,594,720 A | 1/1997 | Papadopoulos et al. |
| 5,594,949 A | 1/1997 | Andersson et al. |
| 5,603,093 A | 2/1997 | Yoshimi et al. |
| 5,604,730 A | 2/1997 | Tiedemann, Jr. |
| 5,612,948 A | 3/1997 | Fette et al. |
| 5,621,723 A | 4/1997 | Walton, Jr. et al. |
| 5,621,752 A | 4/1997 | Antonio et al. |
| 5,634,195 A | 5/1997 | Sawyer |
| 5,638,412 A | 6/1997 | Blakeney, II et al. |
| 5,648,955 A | 7/1997 | Jensen et al. |
| 5,649,290 A | 7/1997 | Wang |
| 5,654,979 A | 8/1997 | Levin et al. |
| 5,666,649 A | 9/1997 | Dent |
| 5,680,395 A | 10/1997 | Weaver, Jr. et al. |
| 5,682,605 A | 10/1997 | Salter |
| 5,697,053 A | 12/1997 | Hanly |
| 5,699,365 A | 12/1997 | Klayman et al. |
| 5,701,294 A | 12/1997 | Ward et al. |
| 5,706,145 A | 1/1998 | Hindman et al. |
| 5,710,768 A | 1/1998 | Ziv et al. |
| 5,710,974 A * | 1/1998 | Granlund et al. ............. 455/436 |
| 5,726,978 A | 3/1998 | Frodigh et al. |
| 5,729,557 A | 3/1998 | Gardner et al. |
| 5,734,646 A | 3/1998 | I et al. |
| 5,734,647 A | 3/1998 | Yoshida et al. |
| 5,745,480 A | 4/1998 | Behtash et al. |
| 5,748,677 A | 5/1998 | Kumar |
| 5,751,725 A | 5/1998 | Chen |
| 5,757,367 A | 5/1998 | Kapoor |
| 5,757,810 A | 5/1998 | Fall |
| 5,764,687 A | 6/1998 | Easton |
| 5,764,699 A | 6/1998 | Needham et al. |
| 5,764,899 A | 6/1998 | Eggleston et al. |
| 5,768,533 A | 6/1998 | Ran |
| 5,771,226 A | 6/1998 | Kaku |
| 5,771,451 A | 6/1998 | Takai et al. |
| 5,771,461 A | 6/1998 | Love et al. |
| 5,774,809 A | 6/1998 | Tuutijarvi et al. |
| 5,781,539 A | 7/1998 | Tanaka |
| 5,781,583 A | 7/1998 | Bruckert et al. |
| 5,787,133 A | 7/1998 | Marchetto et al. |
| 5,793,759 A | 8/1998 | Rakib et al. |
| 5,794,129 A | 8/1998 | Komatsu |
| 5,799,005 A | 8/1998 | Soliman |
| 5,802,046 A | 9/1998 | Scott |
| 5,805,581 A | 9/1998 | Uchida et al. |
| 5,805,585 A | 9/1998 | Javitt et al. |
| 5,812,938 A | 9/1998 | Gilhousen et al. |
| 5,822,315 A | 10/1998 | De Seze et al. |
| 5,822,318 A | 10/1998 | Tiedemann, Jr. et al. |
| 5,822,358 A | 10/1998 | Johansen |
| 5,822,359 A | 10/1998 | Bruckert et al. |
| 5,825,761 A | 10/1998 | Tanaka et al. |
| 5,832,368 A | 11/1998 | Nakano et al. |
| 5,835,508 A | 11/1998 | Kushita |
| 5,842,113 A | 11/1998 | Nanda et al. |
| 5,845,212 A | 12/1998 | Tanaka |

(56) References Cited

U.S. PATENT DOCUMENTS

| | | |
|---|---|---|
| 5,848,357 A | 12/1998 | Dehner et al. |
| 5,850,605 A | 12/1998 | Souissi et al. |
| 5,857,147 A | 1/1999 | Gardner et al. |
| 5,862,132 A | 1/1999 | Blanchard et al. |
| 5,862,453 A | 1/1999 | Love et al. |
| 5,870,393 A | 2/1999 | Yano et al. |
| 5,872,775 A | 2/1999 | Saints et al. |
| 5,878,038 A | 3/1999 | Willey |
| 5,883,887 A | 3/1999 | Take et al. |
| 5,896,561 A | 4/1999 | Schrader et al. |
| 5,901,142 A | 5/1999 | Averbuch et al. |
| 5,903,554 A | 5/1999 | Saints |
| 5,914,950 A | 6/1999 | Tiedemann, Jr. et al. |
| 5,914,959 A | 6/1999 | Marchetto et al. |
| 5,918,184 A | 6/1999 | Wang |
| 5,920,551 A | 7/1999 | Na et al. |
| 5,923,650 A | 7/1999 | Chen et al. |
| 5,930,288 A | 7/1999 | Eberhardt |
| 5,933,421 A | 8/1999 | Alamouti et al. |
| 5,933,462 A | 8/1999 | Viterbi et al. |
| 5,933,787 A | 8/1999 | Gilhousen et al. |
| 5,937,002 A | 8/1999 | Andersson et al. |
| 5,937,357 A | 8/1999 | Tanaka |
| 5,940,765 A | 8/1999 | Haartsen |
| 5,943,327 A | 8/1999 | Mademann |
| 5,943,329 A | 8/1999 | Ohgoshi et al. |
| 5,943,331 A | 8/1999 | Lavean |
| 5,946,346 A | 8/1999 | Ahmed et al. |
| 5,946,356 A | 8/1999 | Felix et al. |
| 5,946,621 A * | 8/1999 | Chheda et al. ............ 455/440 |
| 5,950,124 A | 9/1999 | Trompower et al. |
| 5,953,325 A | 9/1999 | Willars |
| 5,956,642 A | 9/1999 | Larsson et al. |
| 5,960,350 A | 9/1999 | Schorman et al. |
| 5,963,548 A | 10/1999 | Virtanen |
| 5,966,384 A | 10/1999 | Felix et al. |
| 5,974,106 A | 10/1999 | Dupont et al. |
| 5,978,657 A | 11/1999 | Suzuki |
| 5,991,627 A | 11/1999 | Honkasalo et al. |
| 6,002,919 A | 12/1999 | Posti |
| 6,005,856 A | 12/1999 | Jensen et al. |
| 6,026,081 A * | 2/2000 | Hamabe .................. 370/335 |
| 6,028,852 A | 2/2000 | Miya et al. |
| 6,038,263 A * | 3/2000 | Kotzin et al. ............ 375/299 |
| 6,052,594 A | 4/2000 | Chuang et al. |
| 6,067,324 A | 5/2000 | Harrison |
| 6,069,884 A | 5/2000 | Hayashi et al. |
| 6,073,025 A | 6/2000 | Chheda et al. |
| 6,088,324 A | 7/2000 | Sato |
| 6,088,335 A | 7/2000 | I et al. |
| 6,091,737 A | 7/2000 | Hong et al. |
| 6,091,757 A | 7/2000 | Cudak et al. |
| 6,097,704 A | 8/2000 | Jackson et al. |
| 6,101,394 A | 8/2000 | Illidge |
| 6,112,084 A | 8/2000 | Sicher et al. |
| 6,134,220 A | 10/2000 | Le Strat et al. |
| 6,137,789 A | 10/2000 | Honkasalo |
| 6,137,839 A | 10/2000 | Mannering et al. |
| 6,137,991 A | 10/2000 | Isaksson |
| 6,151,502 A | 11/2000 | Padovani et al. |
| 6,161,013 A | 12/2000 | Anderson et al. |
| 6,163,707 A | 12/2000 | Miller |
| 6,167,031 A | 12/2000 | Olofsson et al. |
| 6,173,005 B1 | 1/2001 | Kotzin et al. |
| 6,173,007 B1 | 1/2001 | Odenwalder et al. |
| 6,174,558 B1 | 1/2001 | Lamptey et al. |
| 6,175,448 B1 | 1/2001 | Xie et al. |
| 6,175,550 B1 | 1/2001 | Van Nee |
| 6,175,558 B1 | 1/2001 | Miya |
| 6,175,590 B1 | 1/2001 | Stein |
| 6,178,448 B1 | 1/2001 | Gray et al. |
| 6,179,007 B1 | 1/2001 | Cote |
| 6,188,906 B1 | 2/2001 | Lim et al. |
| 6,189,122 B1 | 2/2001 | Cheng |
| 6,212,176 B1 | 4/2001 | Andersson et al. |
| 6,212,988 B1 | 4/2001 | Chernyshov et al. |
| 6,215,988 B1 | 4/2001 | Matero |
| 6,219,343 B1 | 4/2001 | Honkasalo et al. |
| 6,222,832 B1 | 4/2001 | Proctor |
| 6,222,875 B1 | 4/2001 | Dahlman et al. |
| 6,233,231 B1 | 5/2001 | Felix et al. |
| 6,236,365 B1 | 5/2001 | LeBlanc et al. |
| 6,263,205 B1 | 7/2001 | Yamaura et al. |
| 6,266,339 B1 | 7/2001 | Donahue et al. |
| 6,269,088 B1 * | 7/2001 | Masui et al. ............... 370/335 |
| 6,272,124 B1 | 8/2001 | Ahn et al. |
| 6,285,655 B1 | 9/2001 | Lundby et al. |
| 6,285,886 B1 | 9/2001 | Kamel et al. |
| 6,307,844 B1 | 10/2001 | Tsunehara et al. |
| 6,307,851 B1 | 10/2001 | Jung et al. |
| 6,308,072 B1 | 10/2001 | Labedz et al. |
| 6,317,413 B1 | 11/2001 | Honkasalo |
| 6,317,435 B1 | 11/2001 | Tiedemann, Jr. et al. |
| 6,320,851 B1 | 11/2001 | Kim et al. |
| 6,335,922 B1 | 1/2002 | Tiedemann, Jr. et al. |
| 6,347,217 B1 | 2/2002 | Bengtsson et al. |
| 6,356,555 B1 | 3/2002 | Rakib et al. |
| 6,366,778 B1 | 4/2002 | Bender et al. |
| 6,377,809 B1 | 4/2002 | Rezaiifar et al. |
| 6,389,066 B1 | 5/2002 | Ejzak |
| 6,393,005 B1 | 5/2002 | Mimura |
| 6,400,695 B1 | 6/2002 | Chuah et al. |
| 6,434,367 B1 | 8/2002 | Kumar et al. |
| 6,434,380 B1 | 8/2002 | Andersson et al. |
| 6,434,637 B1 | 8/2002 | D'Errico |
| 6,438,115 B1 | 8/2002 | Mazur et al. |
| 6,445,908 B1 | 9/2002 | Glazko |
| 6,456,652 B1 | 9/2002 | Kim et al. |
| 6,470,024 B1 | 10/2002 | Hamalainen et al. |
| 6,470,044 B1 | 10/2002 | Kowalski |
| 6,483,825 B2 | 11/2002 | Seta |
| 6,487,259 B1 | 11/2002 | Russo |
| 6,496,543 B1 | 12/2002 | Zehavi |
| 6,501,958 B1 | 12/2002 | Hwang et al. |
| 6,512,925 B1 | 1/2003 | Chen et al. |
| 6,545,986 B1 | 4/2003 | Stellakis |
| 6,563,809 B1 | 5/2003 | Proctor, Jr. et al. |
| 6,567,374 B1 | 5/2003 | Bohnke et al. |
| 6,567,461 B1 | 5/2003 | Moon et al. |
| 6,570,860 B2 | 5/2003 | Hamalainen et al. |
| 6,574,211 B2 | 6/2003 | Padovani et al. |
| 6,574,266 B1 | 6/2003 | Haartsen |
| 6,574,267 B1 | 6/2003 | Kanterakis et al. |
| 6,577,618 B2 | 6/2003 | Diachina et al. |
| 6,580,899 B1 | 6/2003 | Dalgleish et al. |
| 6,590,873 B1 | 7/2003 | Li et al. |
| 6,606,311 B1 | 8/2003 | Wang et al. |
| 6,615,052 B1 | 9/2003 | Parmenter |
| 6,621,804 B1 | 9/2003 | Holtzman et al. |
| 6,625,433 B1 | 9/2003 | Poirier et al. |
| 6,636,496 B1 | 10/2003 | Cho et al. |
| 6,643,520 B1 | 11/2003 | Park et al. |
| 6,668,159 B1 | 12/2003 | Olofsson et al. |
| 6,711,150 B1 | 3/2004 | Vanghi |
| 6,711,415 B1 | 3/2004 | McCarthy |
| 6,717,926 B1 | 4/2004 | Deboille et al. |
| 6,725,043 B2 | 4/2004 | Bonta et al. |
| 6,728,233 B1 | 4/2004 | Park et al. |
| 6,757,270 B1 | 6/2004 | Kumar et al. |
| 6,760,587 B2 | 7/2004 | Holtzman et al. |
| 6,804,214 B1 | 10/2004 | Lundh et al. |
| 6,810,030 B1 | 10/2004 | Kuo |
| 6,834,047 B1 | 12/2004 | Yoon et al. |
| 6,850,506 B1 | 2/2005 | Holtzman et al. |
| 6,859,446 B1 | 2/2005 | Gopalakrishnan et al. |
| 6,894,994 B1 * | 5/2005 | Grob et al. ............... 370/335 |
| 6,898,437 B1 | 5/2005 | Larsen et al. |
| 6,912,228 B1 | 6/2005 | Dahlman et al. |
| 6,917,808 B1 | 7/2005 | Nelson |
| 6,971,098 B2 | 11/2005 | Khare et al. |
| 6,973,062 B1 | 12/2005 | Han |
| 6,973,098 B1 | 12/2005 | Lundby et al. |
| 6,975,604 B1 | 12/2005 | Ishida et al. |
| 7,002,920 B1 | 2/2006 | Ayyagari et al. |

(56) References Cited

U.S. PATENT DOCUMENTS

| | | |
|---|---|---|
| 7,016,649 B1 | 3/2006 | Narasimhan et al. |
| 7,068,683 B1 | 6/2006 | Lundby et al. |
| 7,072,321 B2 | 7/2006 | Holtzman et al. |
| 7,072,322 B2 | 7/2006 | Holtzman et al. |
| 7,079,550 B2 | 7/2006 | Padovani et al. |
| 7,133,460 B2 | 11/2006 | Bae et al. |
| 7,154,846 B2 | 12/2006 | Chen et al. |
| 7,184,426 B2 | 2/2007 | Padovani et al. |
| 7,194,006 B2 | 3/2007 | Wong et al. |
| 7,289,473 B1 * | 10/2007 | Padovani et al. ............. 370/332 |
| 7,349,714 B2 | 3/2008 | Lee et al. |
| 7,397,767 B2 | 7/2008 | Taffin et al. |
| 7,499,427 B2 | 3/2009 | Padovani et al. |
| 7,848,282 B2 | 12/2010 | Padovani et al. |
| 7,848,283 B2 | 12/2010 | Padovani et al. |
| 7,848,284 B2 | 12/2010 | Padovani et al. |
| 7,848,285 B2 | 12/2010 | Padovani et al. |
| 7,995,531 B2 | 8/2011 | Padovani et al. |
| 8,005,042 B2 | 8/2011 | Padovani et al. |
| 8,009,625 B2 | 8/2011 | Padovani et al. |
| 8,064,409 B1 | 11/2011 | Gardner et al. |
| 8,068,453 B2 | 11/2011 | Holtzman et al. |
| 8,077,655 B2 | 12/2011 | Padovani et al. |
| 8,089,924 B2 | 1/2012 | Padovani et al. |
| 8,102,882 B2 | 1/2012 | Wang et al. |
| 8,189,540 B2 | 5/2012 | Padovani et al. |
| 2001/0033558 A1 | 10/2001 | Matsuki |
| 2001/0046879 A1 | 11/2001 | Schramm et al. |
| 2002/0160781 A1 | 10/2002 | Bark et al. |
| 2002/0196768 A1 | 12/2002 | Ohgoshi et al. |
| 2004/0224719 A1 | 11/2004 | Nounin et al. |
| 2005/0254465 A1 | 11/2005 | Lundby et al. |
| 2006/0187877 A1 | 8/2006 | Lundby et al. |
| 2006/0280160 A1 | 12/2006 | Padovani et al. |
| 2007/0025267 A1 | 2/2007 | Padovani et al. |
| 2008/0008136 A1 | 1/2008 | Padovani et al. |
| 2008/0101303 A1 | 5/2008 | Kim |
| 2008/0298382 A1 | 12/2008 | Galli et al. |
| 2008/0318562 A1 | 12/2008 | Featherstone et al. |
| 2009/0310588 A1 | 12/2009 | Padovani et al. |
| 2010/0023644 A1 | 1/2010 | Laffra et al. |
| 2011/0069629 A1 | 3/2011 | Breit et al. |
| 2012/0033628 A1 | 2/2012 | Eriksson et al. |
| 2013/0094391 A1 | 4/2013 | Padovani et al. |

FOREIGN PATENT DOCUMENTS

| | | |
|---|---|---|
| CA | 2239524 A1 | 1/1999 |
| CA | 2427007 A1 | 6/2002 |
| CN | 1144444 A | 3/1997 |
| CN | 1256817 | 6/2000 |
| CN | 1262825 A | 8/2000 |
| CN | 1269934 A | 10/2000 |
| CN | 1301475 A | 6/2001 |
| CN | 101523748 A | 9/2009 |
| DE | 19913086 A1 | 10/2000 |
| EP | 0353759 A2 | 2/1990 |
| EP | 0412583 A2 | 2/1991 |
| EP | 0418865 A2 | 3/1991 |
| EP | 0600713 A2 | 6/1994 |
| EP | 0656716 A1 | 6/1995 |
| EP | 0716520 A1 | 6/1996 |
| EP | 0720407 A2 | 7/1996 |
| EP | 0729240 A2 | 8/1996 |
| EP | 0762703 A1 | 3/1997 |
| EP | 0767548 | 4/1997 |
| EP | 0779755 A2 | 6/1997 |
| EP | 0847147 A2 | 6/1998 |
| EP | 0887947 A2 | 12/1998 |
| EP | 0899906 A2 | 3/1999 |
| EP | 0924878 A2 | 6/1999 |
| EP | 0936753 A2 | 8/1999 |
| EP | 0977371 A2 | 2/2000 |
| EP | 1022862 | 7/2000 |
| GB | 715435 A | 9/1954 |
| GB | 2293947 | 4/1996 |
| GB | 2303769 A | 2/1997 |
| GB | 2311702 | 10/1997 |
| JP | 1051354 C | 11/1977 |
| JP | 57159148 A | 10/1982 |
| JP | 59030150 A | 3/1984 |
| JP | 63141432 A | 6/1988 |
| JP | 63184420 | 7/1988 |
| JP | 63252047 A | 10/1988 |
| JP | 1098763 | 4/1989 |
| JP | O1122242 | 5/1989 |
| JP | O1170147 | 7/1989 |
| JP | 2035848 A | 2/1990 |
| JP | 3060251 A | 3/1991 |
| JP | O5276132 | 10/1993 |
| JP | 6318927 A | 11/1994 |
| JP | 8125604 A | 5/1996 |
| JP | H08149176 A | 6/1996 |
| JP | 8506467 | 7/1996 |
| JP | H08506715 A | 7/1996 |
| JP | 8274756 A | 10/1996 |
| JP | 8335899 A | 12/1996 |
| JP | 9008770 A | 1/1997 |
| JP | H0936801 A | 2/1997 |
| JP | 0983600 | 3/1997 |
| JP | 9074378 | 3/1997 |
| JP | H0983484 A | 3/1997 |
| JP | O9093652 | 4/1997 |
| JP | 9186646 | 7/1997 |
| JP | 9191276 A | 7/1997 |
| JP | 9200825 A | 7/1997 |
| JP | 10107769 A | 4/1998 |
| JP | 10155179 A | 6/1998 |
| JP | 10190625 | 7/1998 |
| JP | 10285138 A | 10/1998 |
| JP | H1146198 A | 2/1999 |
| JP | H11046196 A | 2/1999 |
| JP | 11098574 A | 4/1999 |
| JP | 11154904 A | 6/1999 |
| JP | 11234202 | 8/1999 |
| JP | 11284570 | 10/1999 |
| JP | 2000091985 | 3/2000 |
| JP | 2000165927 A | 6/2000 |
| JP | 2000224231 | 8/2000 |
| JP | 2002050984 A | 2/2002 |
| JP | 2002152849 A | 5/2002 |
| JP | 2007335994 A | 12/2007 |
| JP | 2008099317 A | 4/2008 |
| JP | 4339508 | 7/2009 |
| JP | 4382868 | 10/2009 |
| JP | 4594442 | 9/2010 |
| JP | 4594443 | 9/2010 |
| JP | 2011035828 A | 2/2011 |
| KR | 200011799 | 2/2000 |
| RU | 2139636 C1 | 10/1999 |
| RU | 2146850 C1 | 3/2000 |
| SU | 462292 A1 | 2/1975 |
| SU | 1585902 A1 | 8/1990 |
| WO | WO9222162 | 12/1992 |
| WO | WO9418771 A1 | 8/1994 |
| WO | WO9428643 | 12/1994 |
| WO | WO9500821 A1 | 1/1995 |
| WO | WO9503652 A1 | 2/1995 |
| WO | WO9507578 A1 | 3/1995 |
| WO | WO9512938 | 5/1995 |
| WO | WO-9516319 A1 | 6/1995 |
| WO | WO9528814 A1 | 10/1995 |
| WO | WO9600466 | 1/1996 |
| WO | WO9608908 A2 | 3/1996 |
| WO | WO9610320 | 4/1996 |
| WO | WO-9631013 A1 | 10/1996 |
| WO | WO9709810 A1 | 3/1997 |
| WO | WO9711535 | 3/1997 |
| WO | WO9715131 A2 | 4/1997 |
| WO | WO-9730519 A2 | 8/1997 |
| WO | WO9737443 A1 | 10/1997 |
| WO | WO-9737456 A2 | 10/1997 |
| WO | WO9740592 A1 | 10/1997 |

(56) References Cited

FOREIGN PATENT DOCUMENTS

| WO | WO9819405 | 5/1998 |
| --- | --- | --- |
| WO | WO98035514 | 8/1998 |
| WO | WO-9838757 A1 | 9/1998 |
| WO | WO9852307 A1 | 11/1998 |
| WO | WO9852327 A2 | 11/1998 |
| WO | WO9859443 A1 | 12/1998 |
| WO | WO9859449 | 12/1998 |
| WO | WO9859451 A1 | 12/1998 |
| WO | WO9903225 A1 | 1/1999 |
| WO | WO9914975 | 3/1999 |
| WO | WO9918684 | 4/1999 |
| WO | WO9918702 | 4/1999 |
| WO | WO9923844 | 5/1999 |
| WO | WO9943101 | 8/1999 |
| WO | WO9949588 | 9/1999 |
| WO | WO-9950977 A1 | 10/1999 |
| WO | WO9966744 A1 | 12/1999 |
| WO | WO04728 | 1/2000 |
| WO | WO0008706 A2 | 2/2000 |
| WO | WO14899 | 3/2000 |
| WO | WO0014908 A1 | 3/2000 |
| WO | WO33472 A1 | 6/2000 |
| WO | WO33480 | 6/2000 |
| WO | WO0041542 | 7/2000 |
| WO | WO0041543 | 7/2000 |
| WO | WO-0042804 A1 | 7/2000 |
| WO | WO0042810 | 7/2000 |
| WO | WO0152425 | 7/2001 |
| WO | WO0180445 A2 | 10/2001 |
| WO | WO0235735 | 5/2002 |
| WO | WO-2008018761 A2 | 2/2008 |
| WO | WO2008051466 A2 | 5/2008 |
| WO | WO2008054099 A1 | 5/2008 |

OTHER PUBLICATIONS

3rd Generation Parternership project,Technical specification group radio access network 25.101 section 9.3, User equipment(UE) Radio Transmission and Reception (FDD ,Release Jun. 12, 2005.

3rd Generation Parternership project,Technical specification group radio access network 25.214 section 6A.2 Physical layer procedures(FDD ,Release Jun. 12, 2005 ).

Acampora, "A Wireless Network for Wide-Band Indoor Communications," IEEE Journal on Selection Areas in Communications, vol. SAC-5, Jun. 1987.

An Overview of CDMA Evolution Toward Wideband CDMA.

Bi Q et al.: "The performance of DS-CDMA for wireless local loop" Spread Spectrum Techniques and Applications Proceedings, 1996., IEEE 4th International Symposium on Mainz, Germany Sep. 22-25, 1996, New York, NY, USA,IEEE, US, vol. 3, Sep. 22, 1996, pp. 1330-1333.

Chenhong Huang, An analysis of CDMA 3G wireless communications standards, 1999 IEEE 49th Vehicular Technology Conference, United States of America, IEEE, Jul. 1999, vol. 1, pp. 342-345.

Chuang J C-I et al.: "Uplink power control for TDMA portable radio channels" Proceedings of the International Conference on Communications (ICC). Geneva, May 23-26, 1993, New York, IEEE, US, vol. vol. 3, May 23, 1993, pp. 584-588.

Eng et al: "Comparison of Hybrid FDMA/CDMA Systems in Frequency Selective Rayleigh Fading" IEEE J. of Selected Areas of Communications 12(5): 938-951 (1994).

Falahati, et al., "Implementation of Adaptive 5400 bit/s Modem Frequency Selective HF Radio Links", Electronic Letters: An International Publication, vol. 28, No. 13, Jun. 18, 1992, pp. 1238-1240.

Fifer, et al., "The Low-Cost Packet Radio," Proceedings of the IEEE, vol. 75, No. 1 Jan. 1987.

Filip, et al., "Adaptive Modulation as a Fade Countermeasure. An Olympus Experiment," International Journal of Satellite Communications, vol. 8, 31-41 (1990).

Fischer et al., "Wide-Band Packet Radio for Multipath Environments", IEEE Transactions on Communications, vol. 36, No. 5, pp. 564-576, May 15, 1988.

Fischer et al., "Wide-Band Packet Radio Technology", IEEE Transactions on Communications, vol. 75, No. 1, Jan. 1987.

Foerster et al: "Analysis of Hybrid Coherent FDMA/CDMA Systems in Ricean Multipath Fading" IEEE Transactions on Communications 45(1): 15-18 (1997).

Forney, et al., "Efficient Modulation for Band-Limited Channels", IEEE Journal on Selected Areas in Communications, vol. sac-2, No. 5, Sep. 1984.

Goodman, "Embedded DPCM for variable bit rate transmission", IEEE Transactions on Communications, vol. com-28, No. 7, Jul. 1980.

Goodman, et al.: "Quality of service and bandwith efficiency of cellular mobile radio with variable bit-rate speech transmission", IEEE Trans. on Vehicular Technology, Aug. 1983, vol. VT-32, No. 3, pp. 211-217.

Harper, R.C., "Adaptive Phase and Amplitude Modulation on a Frequency Dispersive Fading Channel", IEEE Transactions on Communications, vol. Com-22, No. 6, Jun. 1974.

Haykin: "An Introduction to Analog and Digital Communications" 1989, John Wiley and Sons, Inc., p. 558.

Heegard, et al., "A Microprocessor-Based PSK Modem for Packet Transmission Over Satellite Channels", IEEE Transactions on Communications, vol. com-26, No. 5, May 1978.

Henry, et al., "HF Radio Data Communication: CW to Clover", Communications Quarterly, Spring 1992, pp. 11-24.

Hirade, et al., "Digital Transmission Technology for Mobile Radio Communication," Regular Members (Yokosuga Electrical Communication Laboratory, NTT, Yokosuga-shi), Feb. 1982.

ITU-T V. 32, "Data communication over the telephone network: A family of 2-wire, duplex modems operating at data signalling rates of up to 9600 bit/s for use on the general switched telephone network and on leased telephone type circuits," V. 32, Mar. 1993.

ITU-T V.22 bis, Data Communication Over the Telephone Network: 2400 Bits Per Second Duplex Modem Using the Frequency Division Technique Standardized for Use on the General Switched Telephone Network and on Point-to-Point 2-Wire Leased Telephone-Type Circuits, 1993.

Jacobsmeyer, "Adaptive Trellis Coded Modulation for Bandlimited Meteor Burst Channels", 1989 IEEE Military Communications Conference (MILCOM '89), vol. 2, pp. 418-422 (Cat. No. 89CH2681-5).

Jacobsmeyer, "Adaptive Trellis Coded Modulation for Bandlimited Meteor Burst Channels", IEEE Journal on Selecte Areas in Communications, vol. 10, No. 3, Apr. 1992.

Jacobsmyer, J.M., "An Adaptive Modulation Scheme for Bandwidth-Limited Meteor-Burst Channels" 21st Century Military Communications—What's Possible?, San Diego, Oct. 23-26, 1988, vol. 3, Oct. 23, 1988, pp. 933-937 IEEE.

Jalali et al: "Performance Comparison of Direct Spread and Multicarrier CDMA Systems" IEEE: 2042-2046 (1998).

Jentz, "Method to conserve power in subscribers using C/I+N detection algorithm", Motorola Technical Developments, vol. 21, Feb. 1994.

Khan, et al., "Adaptive Forward Error Control for Digital Satellite Systems," IEEE Transactions of Aerospace and Electronics Systems, vol. AES-21, No. 4, Jul. 1985.

Kim et al: "The Performance Improvement of a Multicarrier DS-CDMA System Using Both Time-Diversity and Frequency Offset" ETRI J.21(4): 29-40 (1999).

Kinsely, D.N., et al. CDMA 2000: "A Third-Generation Radio Transmission Technology," Bell Labs Technical Journal, Bell Laboratories, US. vol. 3, No. 3, Jul. 1, 1998, pp. 63-78.

Kondo et al: "Performance of Multicarrier DS CDMA Systems" IEEE Transactions on Communications 44(2):238-246 (1996).

Lagarde, P, et al., "The PR4G VHF ECCM System: Extensive Tactical Communications for the Battlefield" Military Communications Conference, 1992. Milcom '92, Conference Record. Communications—Fusing Command, Control and Intelligence., IEEE San Diego, CA, USA Oct. 11-14, 1992, New York, NY, USA, IEEE, US, Oct. 11, 1992, pp. 662-666, XP010060937.

Lee et al: "Direct Sequence Spread Spectrum Walsh-QPSK Modulation" IEEE Transactions on Communications 46(9): 1227-1232 (1998).

Lee et al: "Performance of a Modified Multicarrier Direct Sequence CDMA System" ETRI J.19(1): 1-11 (1997).

Lin, et al., "An Adaptive ARQ Scheme Using Pragmatic TCM", Singapore ICCS 1994 Conference Proceedings, vol. 2, Nov. 14-18, pp. 649-652.

(56) References Cited

OTHER PUBLICATIONS

Ling, Fuyun "A Matched Filter Bound Analysis of Single and Multi-Carrier DS CDMA Communications" 1997 Asia Pacific Microwave Conference pp. 161-164.
Massoumi, et al.: "Adaptive Trellis Coded Modulation for Mobile Communications", IEEE Pacific Rim Conference on Communications, Computers and Signal Processing, May 9-10, 1991, pp. 538-541.
Milstein, et al., "Performance of Meteor-Burst Communication Channels", IEEE Journal on Selected Areas in Communicaions, vol. sac-5, No. 2, Feb. 1987.
Murphy, "Telecommunications Talk," Creative Computing, Jan. 1985, vol. 11, No. 1, pp. 16-22.
Oetting, "An Analysis of Meteor Burst Communications for Military Applications", IEEE Transactions on Communications, vol. com-28, No. 9, Sep. 1980.
Partial Eurpopean Search Report—EP09158507, Search Authority—Mucnih Patent Office—May 29, 2009.
Petit, "Clover II: A Technical Overview, AARL Amateur Radio," San Jose, California, Sep. 27-29, 1991.
Petit, "The "CLOVERLEAF" Performance-Oriented HF Data Communication System," 9th Computer Networking Conference, Sep. 22, 1990, pp. 191-202.
Ristenbatt, et al., "Performance Criteria for Spread Spectrum Communications", IEEE Transactions on Communications, vol. com-25, No. 8, pp. 756-763, Aug. 1977.
Rowitch et al: "Coded Multicarrier DS-CDMA in the Presence of Partial Band Interference" IEEE pp. 204-209 (1996).
Rozenstrauch et al., "Control Channel Interference Detection in TDMA Systems with Frequency Re-Use", Motorola, Inc, Technical Developments, Nov. 1995.
Salz, et al., "An Experimental Digital Multilevel FM Modem", IEEE Transactions on Communications, vol. com-14, No. 3, Jun. 1966, pp. 259-265.
Shinsuke Hara & Ramjee Prasad, Overview of Multicarrier CDMA, IEEE Comm. Mag., Dec. 1997, at 126.
Steele, "Deploying Personal Communication Network," Proceedings Wireless 91, The Third National Seminar & Workshop on Wireless Personal Communications, Sep. 1990, pp. 1-14.
Steele, et al., "Variable Rate QAM for Data Transmission Over Rayleigh Fading Channels," Proceedings Wireless 91, The Third National Seminar & Workshop on Wireless Personal Communications, pp. 1-14, 1991.
Telecommunications Industry Association, "Mobile Station-Base Station Compatibility Standard for Dual-Mode Wideband Spread Spectrum Cellular System," TIA/EIA-95, Jul. 1993.
Thomas, et al., "A New Generation of Digital Microwave Radios for U.S. Military Telephone Networks," IEEE Transactions on Communications, vol. COM-27, No. 12, Dec. 1979.
Thomspon et al., "Analysis of diversity reception improvements in spread spectrum receivers", Proceedings of the IEEE 3rd International Symposium on Spread Spectrum Techniques and Applications, vol. 2, pp. 455-459, Jul. 4-6, 1994, Oulu, Finalnd.
Tyson, Tom: "A Method for Improved Site Selection in a Cell-Based TDMA Fail-Soft System" Motorola Technical Developments; Dec. 1, 1997, pp. 194-195.
U.S. Appl. No. 08/963,386, entitled "Method and Apparatus for High Rate Packet Data Transmission," filed Nov. 3, 1997. Paul E. Bender, et al., QUALCOMM Inc., San Diego, California (USA).
U.S. Appl. No. 09/575,073, entitled "High Data Rate Wireless Packet Data Communications System," filed May 19, 2000. Paul E. Bender, et al., QUALCOMM Inc., San Diego, California (USA).
Vos, "Minimum Distance Channel Quality Metric", Motorola, Inc., Technical Developments, vol. 20, Oct. 1993, pp. 8-9.
Webb, "QAM: The Modulation Scheme for Future Mobile Radio Communications?," Electronics & Communication Engineering Journal, Aug. 1992, pp. 167-176.
Weitzen, et al., "A High Speed Digital Modem for the Meteor Scatter Channel", Proceedings of the Seventeenth Annual Conference on Information Science and Systems, Mar. 23-25, 1983.
Weitzen, "Feasibility of high speed digital communications on the meteor scatter channel", University of Wisconsin, 1983.
West, R. L., Abstract, Data Concentration Method, IBM Technical Disclosure Bulletin, Originally disclosed by IBM on Jul. 1, 1975, pp. 487-489 (3 pages).
Xu et al: "On the Performance of Multicarrier RAKE Systems" IEEE pp. 295-299 (1997).
Xu et al: "Performance of Multicarrier DS CDMA Systems in the Presence of Correlated Fading" IEEE pp. 2050-2054 (1997).
Zhang, et al.: "An Integrated Voice/Data System for mobile indoor Radio Networks Using Multiple Transmission Rate", Global Telecommunications Conference. IEEE, Nov. 27-30, 1989, Dallas, TX, vol. 3, pp. 1366-1370.
Ziemer et al: "Effect of Correlation Between Subcarriers of an MCM/DSSS Communication System" IEEE pp. 146-150 (1996).
Bruhn, S. et al., "Concepts and Solutions for Link Adaption and Inband Signaling for the GSM AMR Speech Coding Standard," IEEE 49th Vehicular Technology Conference, vol. 3, XP002901443, May 16, 1999, pp. 2451-2455, doi: 10.1109/VETEC.1999.778517.
ETSI EN 301 709, V.7.0.2: "Digital cellular telecommunications system (Phase 2+); Link Adaptation (GSM 05.09 version 7.0.2 Release 1998)," (Dec. 1, 1999), pp. 1-13, XP002177164.
Translation of Office Action in Chinese application 01821314.6 corresponding to U.S. Appl. No. 11/165,882, citing CN1256817 dated Apr. 1, 2011.
Translation of Office Action in Japan application 2002-543799 corresponding to U.S. Appl. No. 11/404,414, citing JP10107769, JP2000224231 and WO9428643 dated Dec. 21, 2010.
Translation of Office Action in Japanese application 2010-036136 corresponding to U.S. Appl. No. 11/499,203, citing JP8-274756, JP9-83600, JP9-74378 and JP9-186646 dated Nov. 9, 2010.
Acampora, "The Use of Resource Sharing and Coding to Increase the Capacity of Digital Satellites," IEEE Journal on Selected Areas in Communications, vol. SAC-1 No. 1, Jan. 1983.
Adachi, F. et al., "Wideband multi-rate DS-CDMA for next generation mobile communications systems," Wireless Communications Conference, 1997, Proceedings, Aug. 11-13, 1997. pp. 57-62.
Prasad et. al., IEEE Communications Surveys, $4^{th}$ Quarter 1998, pp. 2-29, An Overview of CDMA Evolution Toward Wideband CDMA.
Ariyavisitakul, et al.: "Network Synchronization of Radio Ports in Wireless Personal Communications", Electronic Letters 28(25): 2312-2314 (1992).
Bi Q et al.: "The performance of DS-CDMA for wireless local loop" Spread Spectrum Techniques and Applications Proceedings, 1996., IEEE 4th International Symposium on Mainz, Germany Sep. 22-25, 1996, New York, NY, USA, IEEE, US, vol. 3, Sep. 22, 1996, pp. 1330-1333.
Buchholz et al., "Real-Time Management of Radio Turnaround in a TDMA/TDD System" MO-LA Technical Developments vol. 22 Jun. 1994.
"CDMA2000 High Rate Packet Data Air Interface Specification," C.S0024 Version 2.0, Published Oct. 27, 2000 by 3rd Generation Partnershp Project 2. Section 8.2.1.3.3.2, 8.2.1.3.3.3, 9.2.1.3.3.2, 9.2.3.3.3.
Chenhong Huang, An analysis of CDMA 3G wireless communication standards, 1999, IEEE 49th Vehicular Technology Conference, United States of America, IEEE, Jul. 1999, vol. 1, pp. 342-345.
Chuang J C-I et al.: "Uplink power control for TDMA portable radio channels" Proceedings of the International Conference on Communications (ICC). Geneva, May 23-26, 1993, New York, IEEE, US, vol. 3, May 23, 1993, pp. 584-588.
Ed Tiedemann, Using a 1X Reverse Link with a 3X Forward Link, 3GPP2 TSG-C Contribution, Aug. 19, 1999, 3GPP2-C30-19990817-038, URL, ftp://ftp.3gpp2.org/TSGC/Working/1999/TSG-C_9908/TSG-C.3/C30-19990817-038%20QCOM%201X_RL.doc.
Eng et al: "Comparison of Hybrid FDMA/CDMA Systems in Frequendy Selective Rayleigh Fading" IEEE J. of Selected Areas of Communications 12(5): 938-951 (1994).
European Search Report—EP07011317, Search Authority—The Hague—Jun. 8, 2007.
International Search Report PCT/US00/030102—International Search Authority—European Patent Office Mar. 23, 2001.
Written Opinion—PCT/US00/030102—International Search Authority—European Patent Office—Dec. 26, 2001.

* cited by examiner

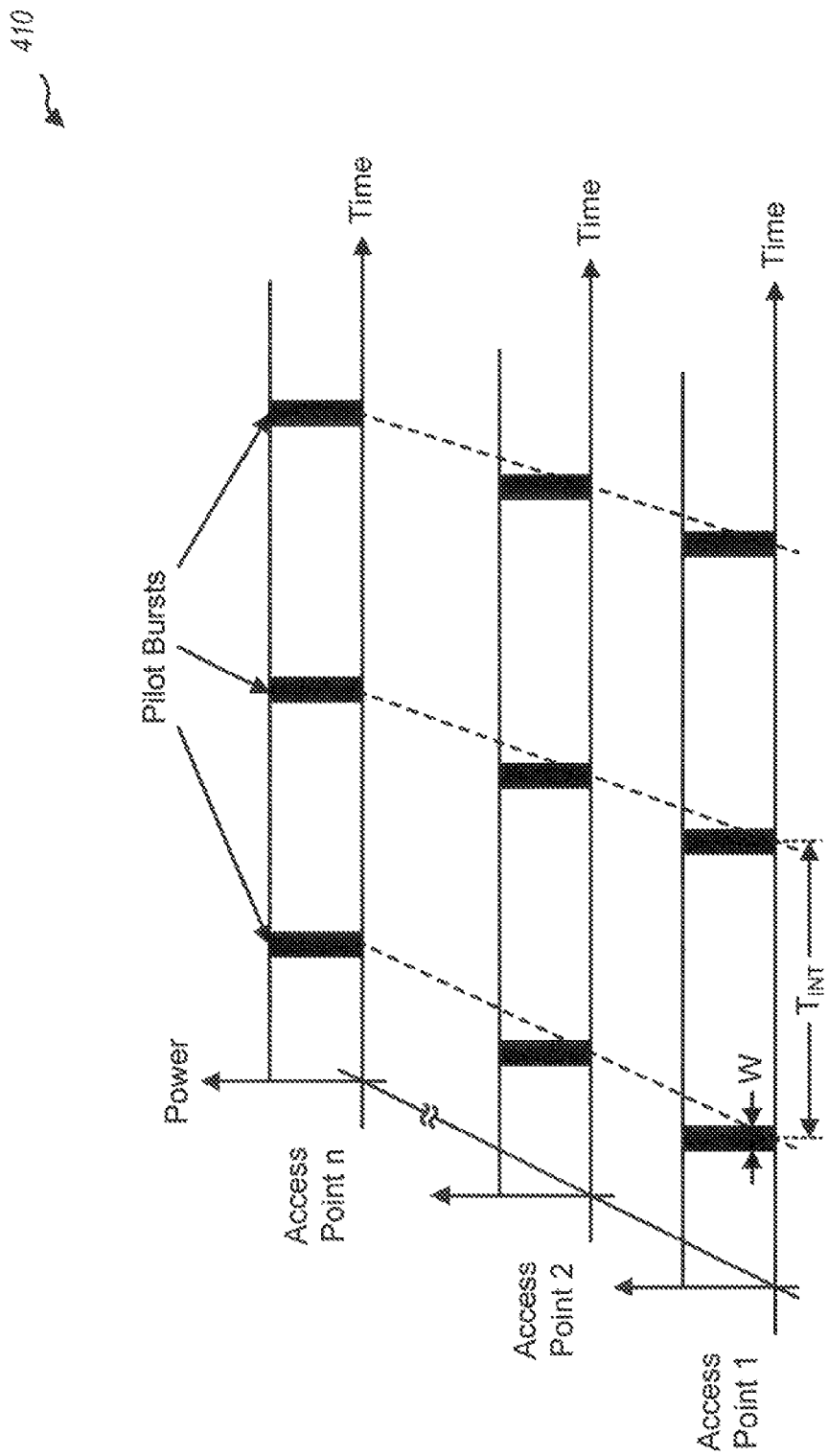

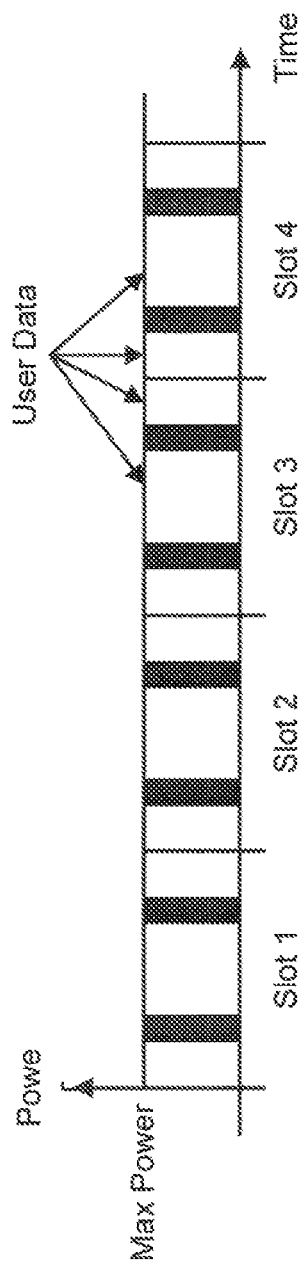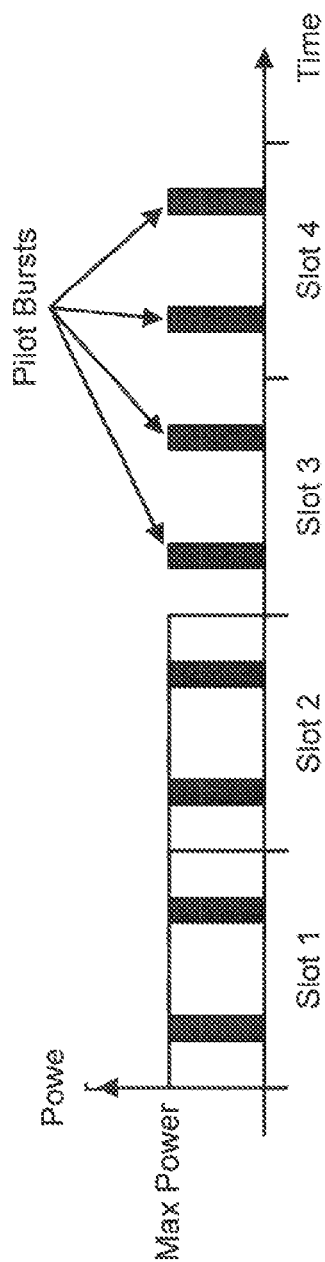

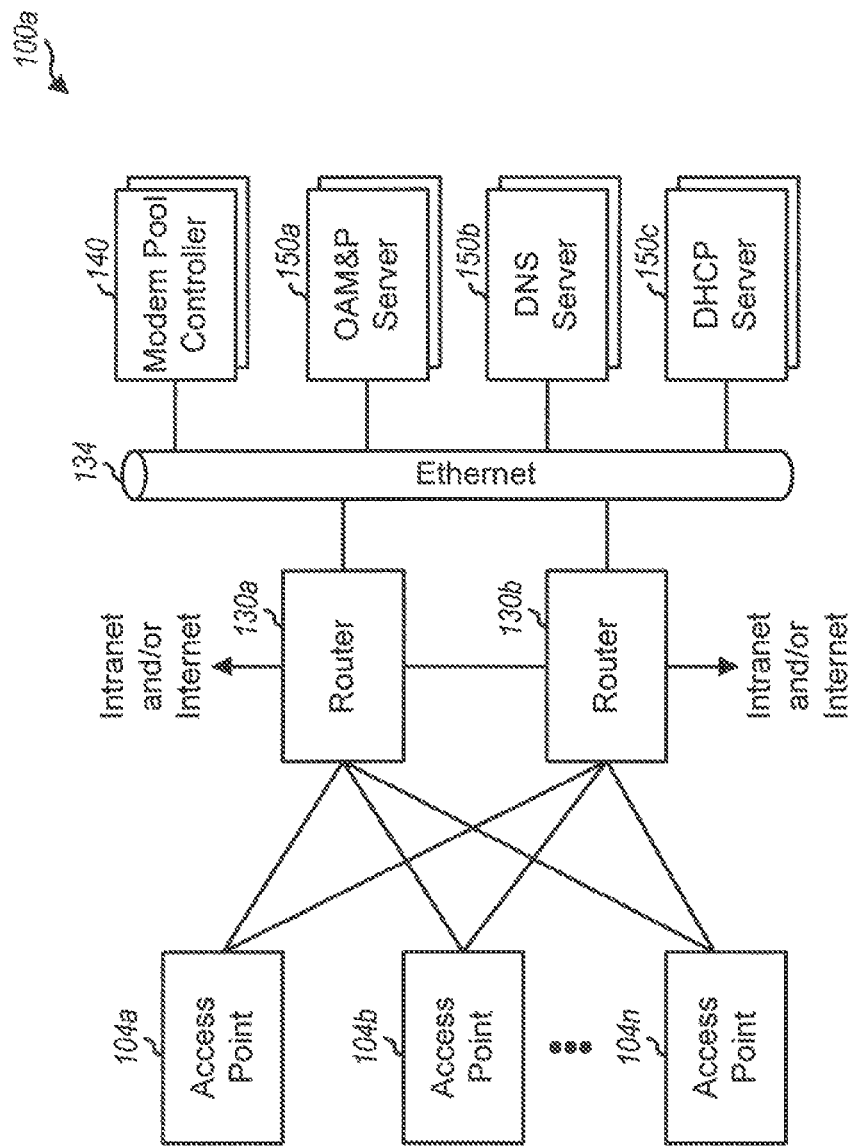

PILOT REFERENCE TRANSMISSION FOR A WIRELESS COMMUNICATION SYSTEM

CLAIM OF PRIORITY UNDER 35 U.S.C. §120

The present application for patent is a Divisional application of application Ser. No. 11/858,840, entitled "PILOT REFERENCE TRANSMISSION FOR A WIRELESS COMMUNICATION SYSTEM", filed Sep. 20, 2007, which is a Continuation of U.S. patent application Ser. No. 09/702,142, entitled "PILOT REFERENCE TRANSMISSION FOR A WIRELESS COMMUNICATION SYSTEM", filed Oct. 30, 2000, which claims priority from provisional U.S. Application Ser. No. 60/163,350, entitled "HIGH DATA RATE SYSTEM AND TECHNOLOGY," filed Nov. 3, 1999, and which is a Continuation-in-Part of U.S. patent application Ser. No. 09/575,073, entitled "HIGH DATA RATE WIRELESS PACKET DATA COMMUNICATIONS SYSTEM," filed May 19, 2000, now U.S. Pat. No. 6,894,994, which is a Continuation-in-Part of U.S. patent application Ser. No. 08/963,386, entitled "METHOD AND APPARATUS FOR HIGH RATE PACKET DATA TRANSMISSION," filed Nov. 3, 1997, now U.S. Pat. No. 6,574,211.

BACKGROUND OF THE INVENTION

I. Field of the Invention

The present invention relates to data communication. More particularly, the present invention relates to a novel and improved pilot reference transmission scheme for use in a wireless communication system.

II. Description of the Related Art

In a wireless communication system, a pilot reference is often transmitted from a transmission source to a receiving device to assist the receiving device performs a number of functions. The pilot reference is typically a predetermined data pattern processed (e.g., covered and spread) in a known manner. The pilot reference can be used at the receiving device to estimate the quality of the transmission link, coherently demodulate the received transmissions, and perform other functions.

A wireless communication system such as a code division multiple access (CDMA) system or a time division multiple access (TDMA) system (e.g., a Global System for Mobile Communications (GSM) system) typically includes a number of base stations that transmit to a number of remote terminals. Each base station is designed to cover a particular coverage area and transmits to the remote terminals within its coverage area. For systems in which neighboring base stations transmit on the same frequency band to improve spectral efficiency, such as many CDMA-based systems, the transmissions from each base station act as interference to those of neighboring base stations, and possibly to its own transmissions due to multipath. This interference degrades the quality of the transmissions received at a remote terminal, including the pilot transmission.

For the conventional IS-95 CDMA system, a pilot reference is continuously transmitted on a dedicated pilot channel at a particular (relatively low) transmit power level. The remote terminal receives and processes the forward link signal to isolate the pilot channel, and further processes the pilot channel to recover the pilot reference. The interference from these other transmissions can affect the quality of the received pilot reference. This interference is worse when the orthogonality between the pilot channel and the traffic channels used for the data transmissions is lost due to, for example, multipath.

The pilot reference transmission scheme used for the IS-95 CDMA system is adequate for voice communication since the data rate is low, which allows the remote terminal more time to process the pilot reference. However, for a high-speed data transmission system in which the link condition is required to be accurately estimated within a short period of time, this continuous low-level pilot reference is not adequate.

As can be seen, a pilot reference transmission scheme that can provide a high quality pilot reference to the remote terminals and allow a remote terminal to quickly and accurately estimate the link condition is highly desirable.

SUMMARY OF THE INVENTION

The present invention provides a novel and improved pilot reference transmission scheme having various advantages over conventional schemes and is well suited for high data rate wireless communication systems. In accordance with an aspect of the invention, to maximize the amount of interference from transmissions from neighboring transmission sources (e.g., access points or base stations) during the pilot interval, and hence minimize the amount of interference from non-transmitting sources during the data intervals, the pilot references are transmitted in bursts at predetermined time intervals, and the pilot bursts from the access points are synchronized. The transmission of pilot bursts from the access points at the same predetermined time intervals results in maximum interference contributions from non-transmitting neighboring access points, facilitating reliable estimation of worst case C/I, and further allows the receiving devices (e.g., access terminals or remote terminals) to easily recognize the bursts as pilot reference.

In accordance with another aspect of the invention, each access point transmits the pilot bursts at or near its maximum transmit power level, if at all, and no user-specific data is transmitted during the pilot bursts. As a result, the pilot bursts are received at the access terminals only in the presence of pilots from other access points and are not affected by other data transmissions. With this pilot reference transmission scheme, the access terminals do not need to subtract the effect of data transmissions since these do not occur during the pilot bursts. This results in a signal-to-noise ratio for the pilot reference that represents the minimum signal-to-noise ratio during the data transmission from the given access point. This aids in rapid and reliable estimation of worst case carrier-to-interference (C/I).

A specific embodiment of the invention provides a method for transmitting pilot references from a number of transmission sources (e.g., access points or base stations). In accordance with the method, one or more signals indicative of a time reference for the communication system are received at each transmission source. The time reference can be derived from a Global Positioning System (GPS) satellite constellation. Pilot bursts for a pilot reference are generated at each transmission source (in a manner described below) and transmitted. The pilot bursts from the transmission sources are in synchronization with the system time reference and are aligned in time at the time of transmission.

The pilot bursts can be generated and transmitted at predetermined time intervals. To minimize interference from data transmissions, the pilot bursts can be transmitted at or near the maximum transmit power level of the transmission source and in the absence of any data transmission.

Other aspects, embodiments, and features of the invention are described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein:

FIG. 2A is a diagram of a pilot reference transmission scheme in accordance with an embodiment of the invention;

FIGS. 2B and 2C are diagrams of an embodiment of an active slot format and an idle slot format, respectively, for transmission from an access point;

FIG. 3 is a block diagram of an embodiment of a communication system, which is a specific implementation of the system shown in FIG. 1 and which can implement the pilot reference transmission scheme of the invention;

DETAILED DESCRIPTION OF THE SPECIFIC EMBODIMENTS

Figure 1:
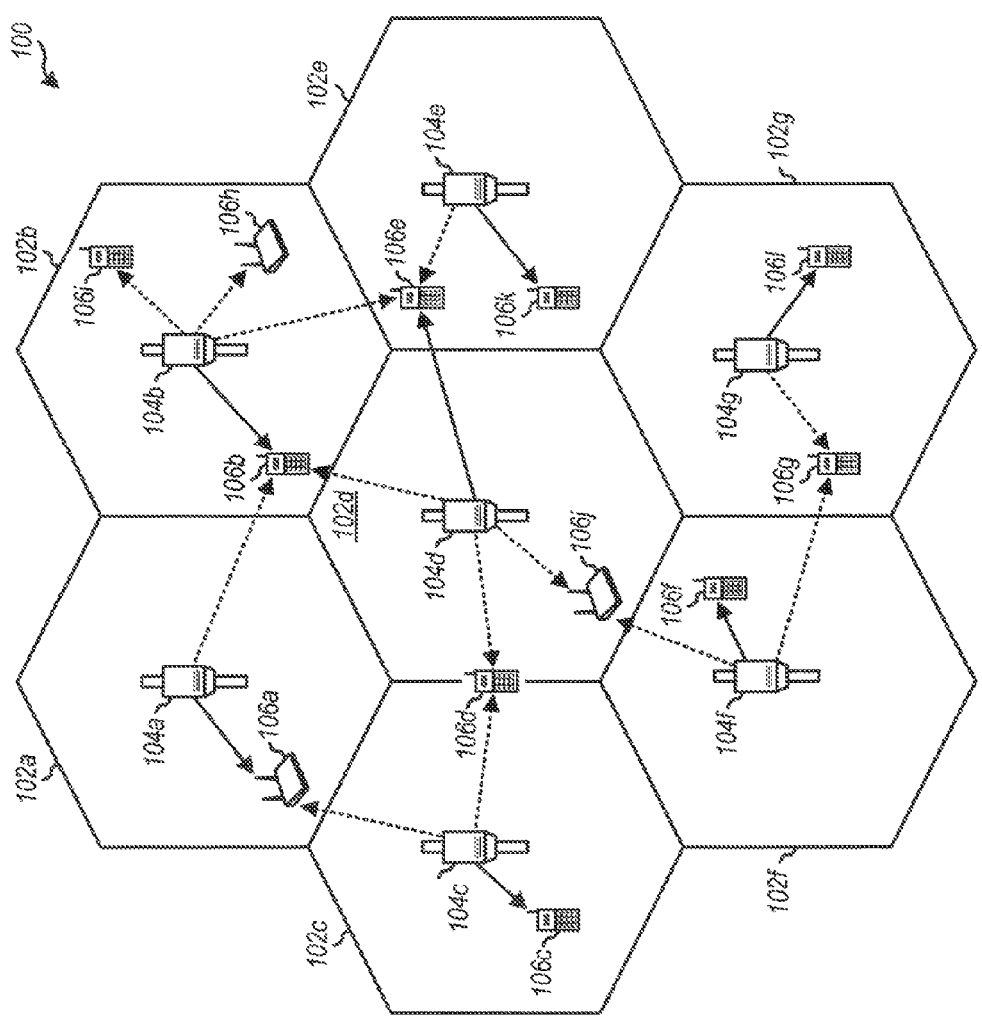
FIG. 1 is a diagram of a wireless communication system that supports a number of users and transmits pilot references.

FIG. 1 is a diagram of a wireless communication system 100 that supports a number of users and transmits pilot references. System 100 provides communication for a number of cells 102a through 102g, with each cell 102 being serviced by a corresponding access point 104 (which may also be referred to as a base station). Various access terminals 106 (which may also be referred to as remote terminals or mobile stations) are dispersed throughout the system.

In an embodiment, each access terminal 106 may communicate with one access point 104 on the forward link at any given moment, and may communicate with one or more access points on the reverse link depending on whether the access terminal is in soft handoff. The forward link (i.e., downlink) refers to transmission from the access point to the access terminal, and the reverse link (i.e., uplink) refers to transmission from the access terminal to the access point. System 100 may be designed to conform to a particular CDMA standard or design, such as the High Data Rate (HDR) design described in the aforementioned U.S. patent application Ser. No. 08/963,386.

In FIG. 1, a solid line with an arrow indicates a user-specific data (or simply, "data") transmission from an access point to an access terminal. A broken line with an arrow indicates that the access terminal is receiving the pilot reference and other signaling (collectively, "pilot") but no user-specific data transmission from the access point. As shown in FIG. 1, access point 104a transmits data to access terminal 106a on the forward link, access point 104b transmits data to access terminal 106b, base station 104c transmits data to access terminal 106c, and so on. The uplink communication is not shown in FIG. 1 for simplicity.

As noted above, the pilot references transmitted from the access points may be used for a number of functions. For the HDR system, the pilot references are used to estimate the link conditions and to determine the particular access point having the best link to the access terminal. The pilot reference is also used to determine the highest data rate supported by that best link. For the HDR system, a pilot reference transmission scheme that allows the access terminal to quickly and accurately estimate the quality of the pilot references would be highly beneficial and may provide improved system performance.

As shown in FIG. 1, an access terminal may receive transmissions from a number of access points. For example, access terminal 106b concurrently receives data and pilot transmissions from access point 104b and pilot transmissions from access points 104a and 104d. For CDMA-based system such as the HDR system, the transmissions from neighboring access points occur over the same frequency band. Thus, each transmission from each access point acts as interference to other transmissions from that access point and neighboring access points.

In accordance with an aspect of the invention, to accurately estimate the maximum amount of interference from transmissions from neighboring access points, the pilot references are transmitted in bursts at predetermined intervals, and the pilot bursts from the access points are synchronized. The transmission of pilot bursts from the access points at the same predetermined time intervals results in maximum interference contributions from non-transmitting neighboring access points, facilitating reliable estimation of worst-case carrier-to-interference (C/I) ratio. The transmission of pilot bursts at the predetermined time intervals further allows the access terminals to easily recognize the bursts as pilot reference.

In accordance with another aspect of the invention, each access point transmits the pilot bursts at or near its maximum transmit power level, if at all, and no user-specific data is transmitted during the pilot bursts. As a result, the pilot bursts are received at the access terminals only in the presence of pilots from other access points and are not affected by other data transmissions. With this pilot reference transmission scheme, the access terminals do not need to subtract the effect of data transmissions since these do not occur during the pilot bursts, which is generally true for the conventional IS-95 CDMA system. This results in accurate estimate of the signal strength from a given pilot, as well as the maximum interference power from other base stations, which aids in reliable estimation of worst-case C/I.

Each access terminal processes the pilot references from the access points and determines the link conditions to these access points based on the received pilot bursts. For the HDR system, the access terminal determines the access point having the best signal quality, based on the received the pilot references, and further determines the highest data rate supported by the best access point. The access terminal may then request for a data transmission at the highest supported data rate from this best access point.

FIG. 2A is a diagram of a pilot reference transmission scheme in accordance with an embodiment of the invention. FIG. 2A shows the transmission of pilot references from a number of access points. In this embodiment, the pilot references are transmitted in bursts of particular width (W) at predetermined time intervals ($T_{INT}$). As indicated in FIG. 2A, the timing of the access points is synchronized such that the pilot bursts are approximately aligned at the time of their transmission. In this transmission scheme, the pilot references from the access points can be received at an access terminal at approximately the same instance in time, with any timing skew between the access points being due to differences in transmission delays and other factors.

Thus, as shown in FIG. 2A, the pilot bursts from neighboring access points can be transmitted at predetermined time intervals and synchronized to reduce the amount of interference from data transmissions. The synchronization of the pilot transmissions from neighboring access points can be achieved in a manner described in further detail below.

In an embodiment, the pilot references from neighboring access points can be differentiated from one another by spreading the pilot data from each access point with a pseudonoise (PN) sequence having a different offset (which is implemented in the HDR system).

At the access terminal, the pilot reference from a selected access point can be recovered by processing the received signal in a manner complementary to that performed at the access point. The processing at the access terminal may include: (1) correlating the received samples with the pilot data pattern for the pilot reference being recovered, (2) decovering the samples with the same orthogonal code used for the pilot at the selected access point, (3) despreading the samples with the same PN sequence at the same time offset, or a combination thereof. This complementary processing recovers the pilot reference from the selected access point and removes the pilot references from other access points. Typically, only small residual amounts of undesired pilot references remain after the complementary processing and are generally due to loss in orthogonality in the communication links caused by, for example, multipath.

FIG. 2B is a diagram of an embodiment of a slot format for transmission from an access point and which supports the pilot reference transmission scheme of the invention. This slot format is advantageously employed in the HDR system. Other slot formats may also be used and are within the scope of the invention.

As shown in FIG. 2B, the transmission from the access point is divided into slots, with each slot corresponding to a particular time interval and including a particular number of chips. For the HDR system, each slot has a duration of 1.67 msec and includes 2048 chips. In the specific embodiment shown in FIG. 2B, each slot includes two pilot bursts, one pilot burst for each half-slot and with each pilot burst being located at the center of the half-slot in which it belongs. In an embodiment, no user-specific data and other signaling is transmitted during the time the pilot bursts are transmitted. User-specific data and other signaling can be transmitted in the remaining time intervals in the slot not occupied by the pilot bursts.

FIG. 2B further shows active transmission of user-specific data for all slots in the time period shown. As also illustrated in FIG. 2B, the pilot bursts are transmitted at or near the maximum transmit power level of the access point. This high power level allows the access terminals to quickly and accurately estimate the quality of the pilot reference from the access point.

FIG. 2C is a diagram of a transmission from an access point in which some of the slots are idle (i.e., no transmission of user-specific data). An idle slot may result if no data is to be transmitted to any access terminal in the cell. In the embodiment shown in FIG. 2C, the pilot bursts are still transmitted for each idle slot so that the access terminals can continue to estimate the link conditions and request transmission from the best serving access point (i.e., the access point with the best link) if a data transmission is subsequently desired. As indicated in FIG. 2C, the pilot bursts for the idle slots are transmitted at or near the maximum transmit power level of the access point and at the same predetermined time intervals, as if the slots were active.

Figure 2D:
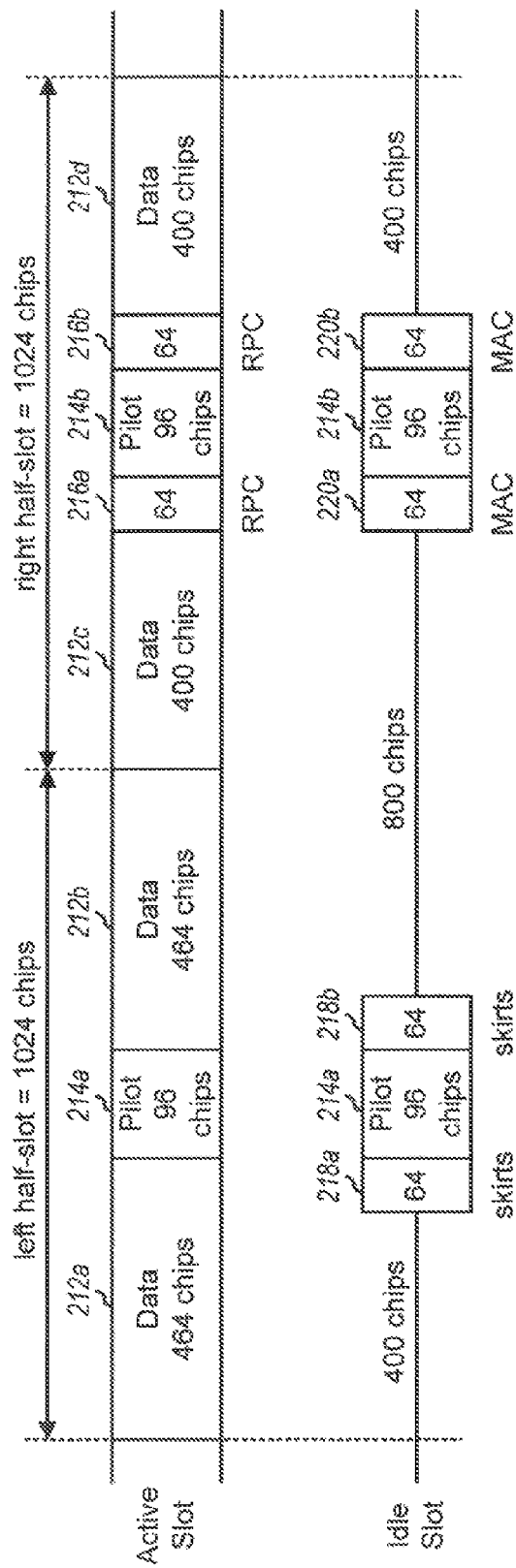
FIG. 2D is a diagram of a slot format defined by an HDR system and which can be used to implement the pilot reference transmission scheme of the invention.

FIG. 2D is a diagram of a slot format defined by the HDR system and which can be used to implement the pilot reference transmission scheme of the invention. In the specific embodiment shown in FIG. 2D, each active slot is divided into two half-slots, with each half-slot including two data partitions 212 separated by a pilot burst 214. Data partitions 212 can be used to transmit user-specific data and signaling, and pilot bursts 214 can be used to transmit the pilot reference.

The first (i.e., left) half-slot includes data partitions 212a and 212b separated by pilot burst 214a, and the second (i.e., right) half-slot includes data partitions 212c and 212d separated by pilot burst 214b. The width of each pilot burst can be selected based on various factors such as, for example, the amount of energy desired to be transmitted in each burst, the maximum transmit power level from the access point, the desired received quality for the pilot burst, the expected worse-case link conditions, the amount of overhead to be allocated for the pilot reference, and so on. For a particular maximum transmit power level, a wider pilot burst corresponds to a higher quality received pilot reference but more overhead. In a specific embodiment (and as implemented in the HDR system), each pilot burst comprises 96 chips of a particular data pattern (e.g., all zeros ("0") data).

In the embodiment shown in FIG. 2D, the second half-slot further includes two signaling bursts 216a and 216b placed on both sides of pilot burst 214b and used to implement a signaling channel. The signaling channel may be used, for example, to transmit reverse power control (RPC) information when the slot is active and Media Access Control (MAC) information when the slot is idle. The RPC information is used to direct the access terminals to adjust their transmit power either up or down to achieve the desired signal quality at the receiving access point.

As shown in the lower half of FIG. 2D, each idle slot is also divided into two half-slots, and each half-slot also includes one pilot burst 214 of the same width (e.g., 96 chips) and located in the same position in the half-slot as in the active slot. The pilot bursts for the idle slot are thus essentially indistinguishable from the pilot bursts for the active slot.

In the embodiment shown in FIG. 2D, two skirts 218a and 218b are positioned on both sides of pilot burst 214a in the first half-slot of the idle slot, and two signaling bursts 220a and 220b are placed on both sides of pilot burst 214b in the second half-slot. Skirts 218a and 218b can comprise pilot data or other data (e.g., pseudo-random data) and are used to provide a transition period between no transmission and pilot transmission and from pilot transmission to no transmission. This transition period allows the pilot reference to reach or be near its steady state value for the duration of the (e.g., 96-chip) pilot burst. If MAC channel or some other channel is always transmitted (at the same power as the pilot) around the pilot bursts, then idle-skirts will not be necessary.

The width of each skirt 218 can be selected based on the overall step response of the (analog and digital) filters used to filter the data and pilot prior to transmission. In the embodiment shown in FIG. 2D, each skirt is 64 chips in duration. If additional time is needed for the pilot reference to reach its steady state value, skirts 218 can be widened and additional skirts can also be placed around signaling bursts 220a and 220b in the second half-slot.

FIG. 3 is a block diagram of an embodiment of a communication system 100a, which is a specific implementation of system 100 in FIG. 1 and which supports the pilot reference transmission scheme of the invention. As shown in FIG. 3, a number of access points 104 are coupled to, and communicate with, a number of consolidation routers 130. Each access point 104 couples to one or more routers 130 via high-speed communication links (e.g., T1/E1, Ethernet, or some other links). To provide redundancy and improve reliability, each access point 120 may be coupled to two or more routers 130, and each router 130 may be coupled in parallel with another router. Each router 130 directs traffics among the access points to which it couples and other network elements and networks coupled to it, such as the Internet. Routers 130 further couple to a (e.g., IP over Ethernet) network 134 that further couples to a modem pool controller 140 and a number of servers 150.

Modem pool controller 140 provides functionality analogous to that of a base station controller (BSC) and a Visitor Location Register (VLR) in an IS-41 network, and can support one or more access points 104. Modem pool controller 140 terminates the Radio Link Protocol (RLP) that contains user traffic, controls the air-link connection for each connected user as the user moves throughout the system, transports access terminal specific messages, and provides MAC functions such as, for example, reverse link outer loop power control synchronization.

Modem pool controller 140 further performs many of the functions typically performed by a conventional BSC for a session such as, for example, session control, connection control, selection functions, and protocol stack maintenance. In an embodiment, for a particular session between an access terminal and system 100a, only one (i.e., the "anchor") modem pool controller 140 has control of the session at any particular moment.

Servers 150 support the operation of system 100a and may includes, for example, an Operating Administration, Maintenance, and Provisioning (OAM&P) server 150a used for configuration and management of system 100a, a Domain Name System (DNS) server 150b that translates domain names into IP addresses, and a Dynamic Host Configuration Protocol (DHCP) server 150c that assigns IP addresses to access terminals if and as they are needed.

The elements of system 100a are described in further detail in the aforementioned U.S. patent application Ser. No. 09/575,073.

Access Point

Figure 4:
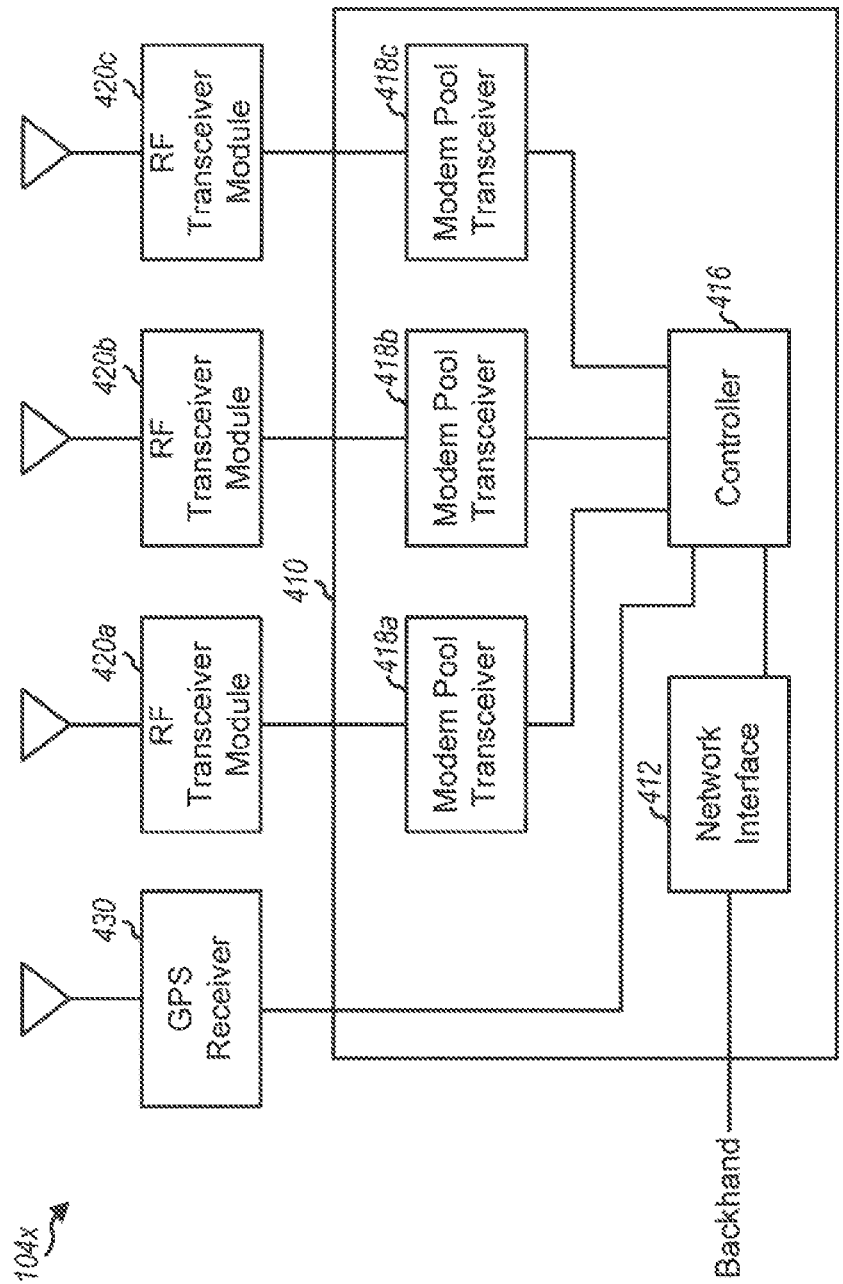
FIG. 4 is a simplified block diagram of a specific embodiment of an access point.

FIG. 4 is a block diagram of a specific embodiment of access point 104x, which is one of the access points in FIG. 1. In this embodiment, access point 104x includes a main unit 410 coupled to a number of RF transceiver modules 420 and a GPS receiver 430.

Main unit 410 includes a network interface 412, a controller 416, and a number of modem pool transceivers (MPTs) 418 (three MPTs are shown in FIG. 4). Each MPT 418 performs data processing and supports a respective sector of a cell. In the forward path, MPT 418 receives (e.g., IP) packets from the backhaul link via network interface 412 and processes the packets to generate a modulated RF signal suitable for transmission. Each MPT 418 further couples to a respective RF transceiver module 420 that conditions the RF signal and further interfaces with an associated antenna. Network interface 412 provides the protocols and transports to interface access point 104x with the external network (e.g., router 130 in FIG. 3). Controller 416 performs the radio link controller functions such as, for example, call processing, selection processing, and others.

Each MPT 418 can further be designed to generate the pilot reference for access point 104x. For many CDMA-based systems, the pilot reference for an access point is typically generated based on a particular pilot data pattern (e.g., an all zeros "0" sequence for the IS-95 and HDR systems). The pilot data is then covered with a particular orthogonal code assigned for the pilot (e.g., a Walsh cover of zero "0" for the IS-95 and HDR systems). The covered data (which constitutes a sequence of all zeros if a pilot data sequence of all zeros and a Walsh cover of zero are used) is then spread with a particular PN sequence assigned to the access point.

As shown in FIG. 4, access point 104x may further include GPS receiver 430 that provides synchronization with the Global Positioning System (GPS) satellite constellation. GPS receiver 430 receives one or more signals from the GPS satellite constellation and processes the received signals to recover timing information from the GPS satellite constellation. The recovered timing information is then provided to controller 416 and can be used to synchronize the internal clock of access point 104x with the timing of the GPS satellite constellation. This timing synchronization can be achieved in a manner known in the art.

Using the GPS satellite constellation to provide the timing information, the timing reference for all access points in the communication system can be derived from, and synchronized to, a single common source. By synchronizing the timing of each access point to the timing of the GPS satellite constellation, neighboring access points can be synchronized and their pilot bursts can be aligned.

In the event that synchronization with the GPS satellite constellation is lost, access point 104x can "freewheel" and maintain synchronization with other access points for a particular time period (e.g., six hours or more). This synchronization can be achieved by receiving periodic timing signals from the modem pool controller, by maintaining a very precise time base at the access point, by some other mechanisms, or a combination thereof.

The elements of access point 104x are described in further detail in the aforementioned U.S. patent application Ser. No. 09/575,073.

Access Terminal

Figure 5:
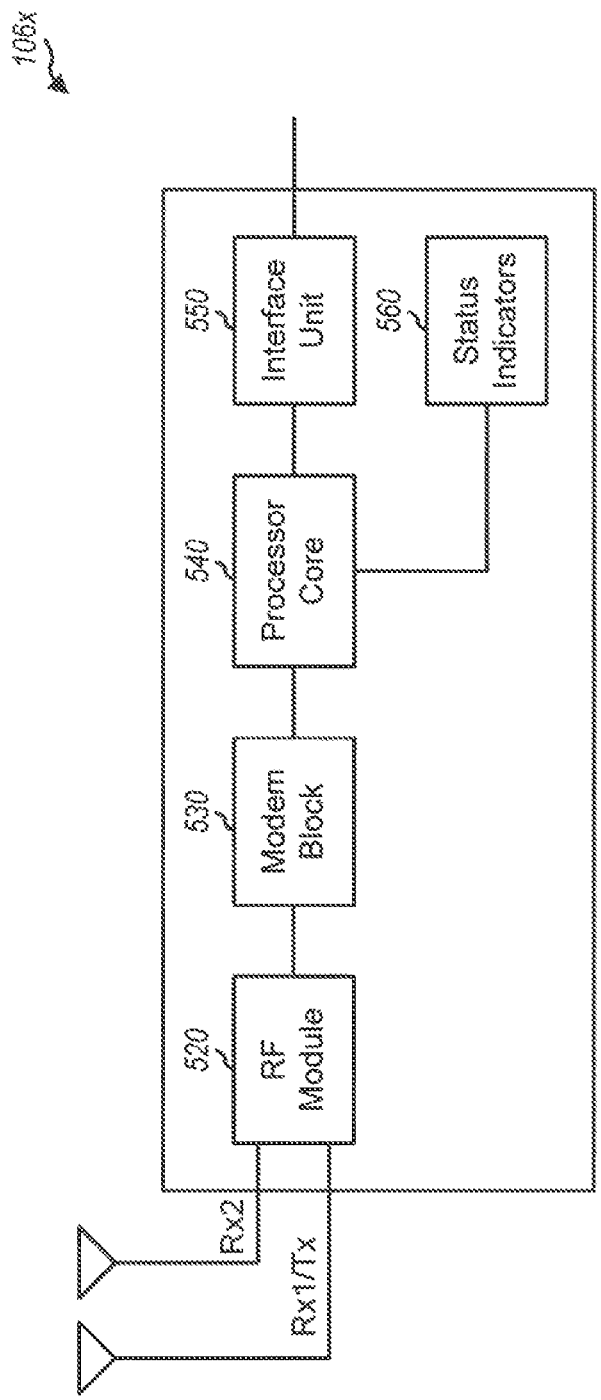
FIG. 5 is a simplified block diagram of a specific embodiment of an access terminal.

FIG. 5 is a simplified block diagram of a specific embodiment of access terminal 106x. Access terminal 106x can be a cellular telephone, a data transceiver unit, or some other device or module. Access terminal 106x includes one or more antennas 510, an RF module 520, a modem block 530, a processor core 540, and an interface unit 550 coupled in series. Processor core 540 further couples to status indicators 560.

In an embodiment, RF module 520 includes two receive chains capable of processing two received signals independently and one transmit chain for processing a reverse link signal. The two autonomous receive chains allow access terminal 106x to benefit from receive diversity combining in the forward link. Each of the receive chains couples to a respective antenna that provides one of the received signals. The transmit chain shares an antenna with one of the receive chains.

Modem block 530 processes the signals on the forward and reverse links. On the forward link, modem block 530 receives two autonomous signals from RF module 520, demodulates and decodes the received signals with the assistance of processor core 540, and forwards the decoded data to processor core 540 for further processing.

Modem block 530 further processes the received signals to recover the pilot references from the access points. Modem block 530 typically digitizes the received signals to generate samples. To recover the pilot reference for a selected access point, the samples are despread with a PN sequence at the particular offset associated with the selected access point, which isolates the pilot reference from the selected access point and removes the pilot references from other access points. The despread samples are then decovered with the orthogonal cover used at the selected access point and further correlated with the pilot data pattern used at the selected access point. If the pilot data is a sequence of all zeros and the orthogonal cover is zero, the pilot reference can be obtained by accumulating the despread samples over the width of each pilot burst. Pilot processing in a CDMA-based system is described in further detail in U.S. Pat. No. 5,764,687, entitled "MOBILE DEMODULATOR ARCHITECTURE FOR A SPREAD SPECTRUM MULTIPLE ACCESS COMMUNICATION SYSTEM," assigned to the assignee of the invention and incorporated herein by reference.

Processor core 540 performs the call processing, modem initialization, and monitoring functions, and further performs the data processing and handling functions for access terminal 106x. Interface unit 550 provides interconnection between access terminal 106x and peripheral devices (e.g., a computer). Status indicators 560 provide indications of the operating state and conditions of access terminal 106x.

The elements of access terminal 106x are described in further detail in the aforementioned U.S. patent application Ser. No. 09/575,073.

The elements of the access points and access terminals can be implemented in various manners. For example, these elements can be implemented using one or more application specific integrated circuits (ASICs), digital signal processors (DSPs), micro-controllers, microprocessors, other electronic circuits designed to perform the functions described herein, or a combination thereof. Also, some of the functions described herein can be implemented with a general-purpose processor or a specially designed processor operated to execute instruction codes that achieve the functions described herein. Thus, the elements of the access points and access terminals described herein can be implemented using hardware, software, or a combination thereof.

The foregoing description of the preferred embodiments is provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. An access terminal for use in a wireless communication system, comprising:
    an RF module configured to receive a modulated signal over a wireless communication link and to condition the received signal to generate a conditioned signal;
    a modem block coupled to the RF module and configured to process the conditioned signal to recover a plurality of pilot references transmitted from a plurality of access points, wherein the pilot reference from each access point is transmitted in pilot bursts that are synchronized with a common system time reference used by each of the plurality of access points and transmitted at a same predetermined time interval during which all of the access points transmit a pilot burst such that at least respective portions of the pilot bursts overlap in time; and
    a processor configured to determine link conditions based on the pilot references, to determine an access point having a highest signal quality based on the link conditions, and to determine a highest supported data rate for the access point having the highest signal quality.

2. The access terminal according to claim 1, wherein the modem block is configured to generate samples from the conditioned signal and to despread the samples with a pseudo-noise (PN) sequence at a particular offset for each of the plurality of access points.

3. The access terminal according to claim 1, wherein the pilot reference from each said access point is received at a maximum transmit power level.

4. The access terminal according to claim 1, wherein the modem block is further configured to:
    correlate received samples with the pilot data pattern for the pilot reference being recovered.

5. The access terminal according to claim 4, wherein the modem block is further configured to:
    despread the samples with a same PN sequence at a same time offset.

6. The access terminal according to claim 5, wherein the modem block is further configured to:
    decover the samples with a same orthogonal code used for the pilot reference at the selected access point.

7. The method of claim 1, further comprising:
    estimating a signal strength for a first pilot reference based on at least one pilot burst associated with the first pilot reference; and
    estimating a maximum interference power for the first pilot reference caused by a second pilot reference.

8. The method of claim 7, further comprising:
    estimating a worst case carrier-to-interference (C/I) ratio for the first pilot reference.

9. An access terminal, comprising:
    means for receiving a plurality of pilot references transmitted from a plurality of access points, the pilot references from each access point being transmitted in pilot bursts that are synchronized with a common time reference used by each of the plurality of access points and transmitted at a same predetermined time interval during which all of the access points transmit a pilot burst such that at least respective portions of the pilot bursts overlap in time;
    means for determining link conditions based on the pilot references;
    means for determining an access point having a highest signal quality based on the link conditions; and
    means for determining a highest supported data rate for the access point having the highest signal quality.

10. The access terminal according to claim 9, further comprising:
    means for determining an access point having a best signal quality based at least on the received pilot references.

11. The access terminal according to claim 9, further comprising:
    means for correlating received samples with a pilot data pattern for the pilot references being recovered.

12. The access terminal according to claim 10, further comprising:
    means for determining a highest data rate supported by the access point.

13. The access terminal according to claim 11, further comprising:
    means for despreading the samples with a same PN sequence at a same time offset.

14. The access terminal according to claim 13, further comprising:
    means for decovering the samples with an orthogonal code used for one of the pilot references at a selected access point.

15. The access terminal according to claim 14, wherein the pilot bursts are aligned in time at the time of transmission.

16. A method for processing a pilot reference, comprising:
receiving a plurality of pilot references transmitted from a plurality of access points, the pilot references from each access point being transmitted in pilot bursts that are synchronized with a common time reference used by each of the plurality of access points and transmitted at a same predetermined time interval during which all of the access points transmit a pilot burst such that at least respective portions of the pilot bursts overlap in time;
determining link conditions based on the pilot references;
determining an access point having a highest signal quality based on the link conditions; and
determining a highest supported data rate for the access point having the highest signal quality.

17. The method for processing a pilot reference according to claim 16, further comprising:
determining an access point having a best signal quality based at least on the received pilot reference.

18. The method for processing a pilot reference according to claim 16, further comprising:
correlating received samples with a pilot data pattern for the pilot reference being recovered.

19. The method for processing a pilot reference according to claim 17, further comprising:
determining a highest data rate supported by the access point.

20. The method for processing a pilot reference according to claim 18, further comprising:
despreading the samples with a same PN sequence at a same time offset.

21. The method for processing a pilot reference according to claim 20, further comprising:
decovering samples with a same orthogonal code used for the pilot reference at a selected access point.

22. The method for processing a pilot reference according to claim 21, wherein the pilot bursts are aligned in time at the time of transmission.

* * * * *